United States Patent Office 3,096,072
Patented July 2, 1963

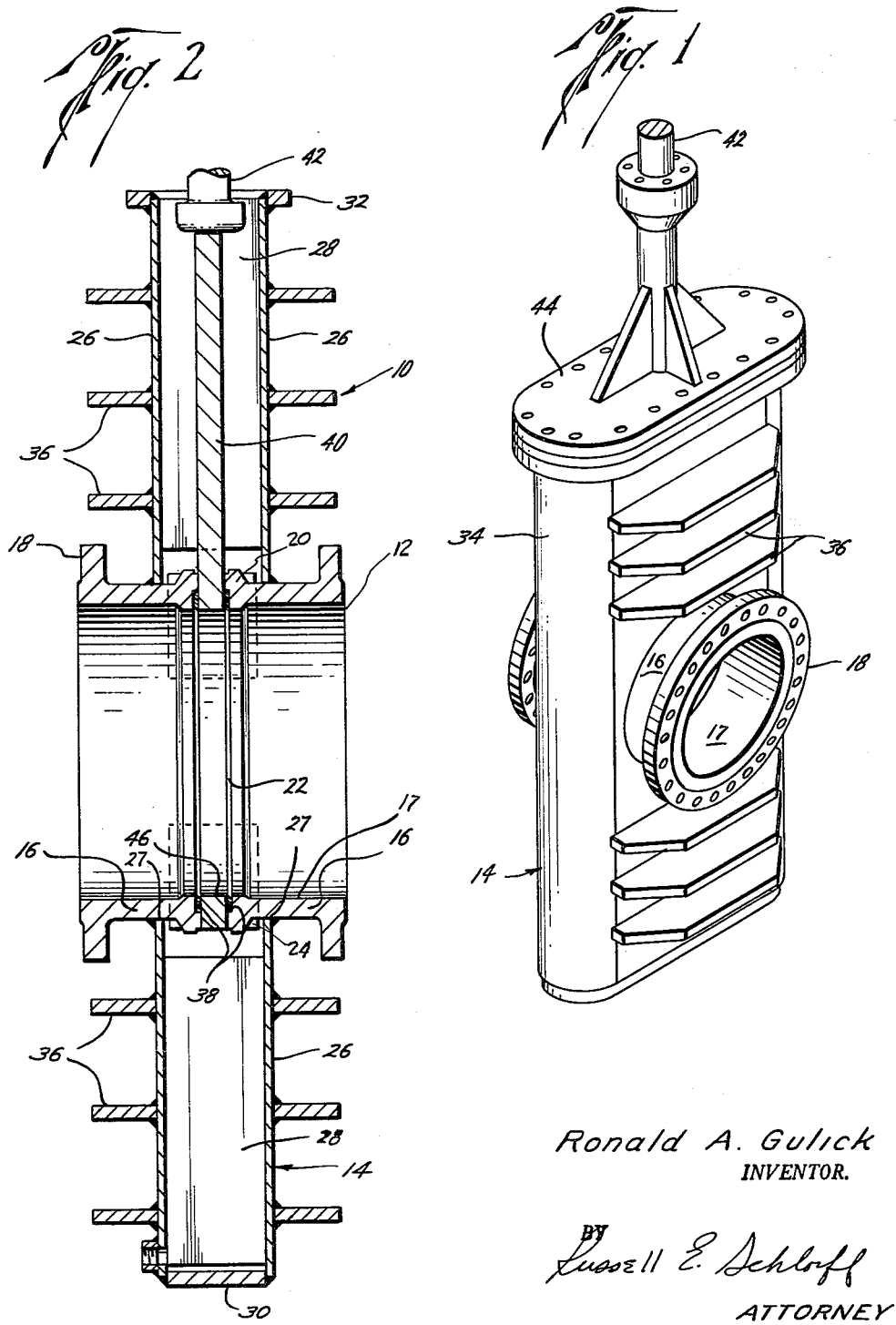
Ronald A. Gulick
INVENTOR.
BY Russell E. Schloff
ATTORNEY

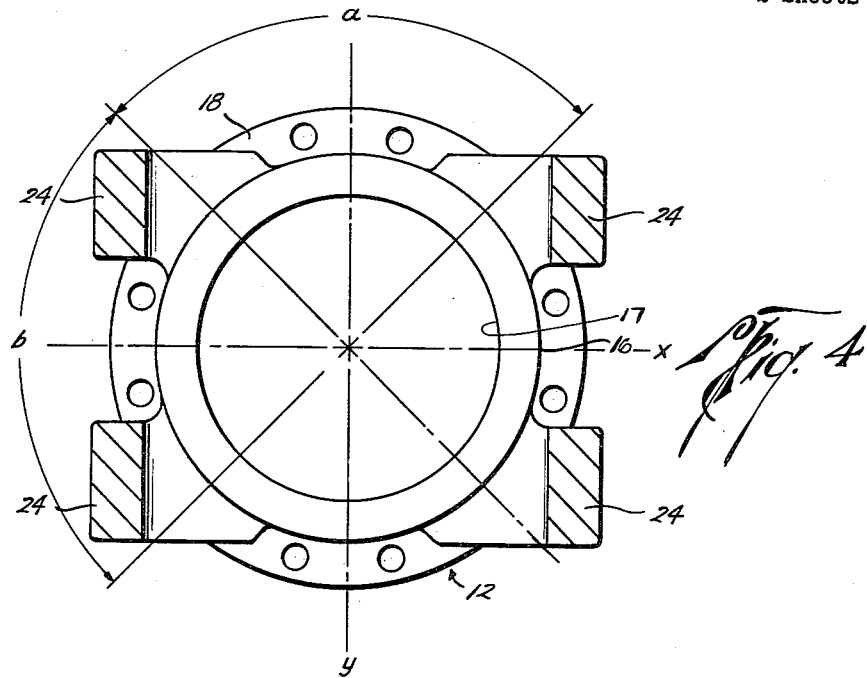
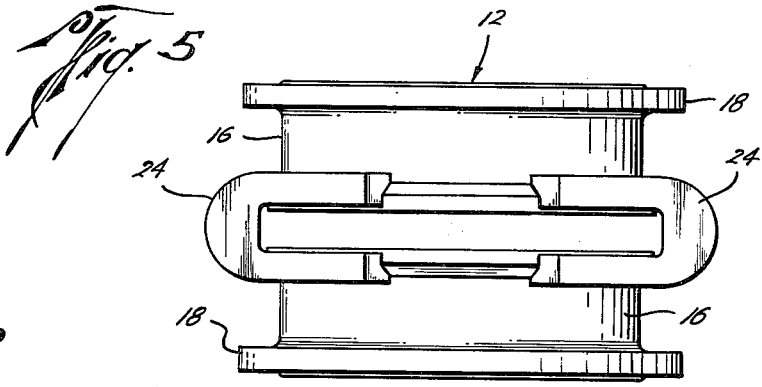
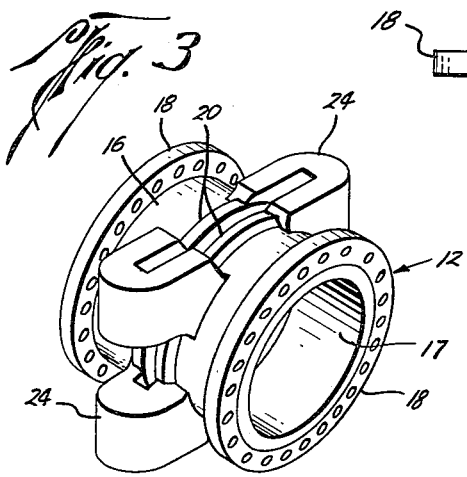
Ronald A. Gulick
INVENTOR.
BY Russell E. Schloff
ATTORNEY

3,096,072
STRUCTURAL CENTER SECTION FOR FABRICATED GATE VALVE
Ronald A. Gulick, Houston, Tex., assignor to ACF Industries, Incorporated, New York, N.Y., a corporation of New Jersey
Filed Nov. 5, 1959, Ser. No. 851,074
2 Claims. (Cl. 251—329)

This invention relates to a fabricated through conduit gate valve and more particularly to the body therefor.

In applications where it is desirable to keep turbulence to a minimum or where scrapers are run through the pipeline, a valve which has an uninterrupted passageway is of great value. A through conduit gate valve has a reciprocating gate member provided with a passage which in the open position becomes a part of the conduit and provides such uninterrupted passageway. Since the gate member is provided with a passage, the gate member extends past the conduit in both open and closed position. In one position the gate is on one side of the conduit and in the other position it is on the other side of the conduit. Accordingly, the valve body has to be designed to accommodate the gate member. Customarily, the bodies for these valves have been cast; however, the cost of patterns represents a large initial expense which if the number to be produced is small makes the cost of the casting relatively expensive. In order to reduce the cost of the body, efforts have been made to fabricate the bodies from plate metal or a combination of forgings, castings and plate metal. While the fabrication of regular gate valves (non through conduit) has been successfully applied, the fabrication of through conduit gate valves has not been too successful. One reason for this is that a valve body not only has to retain the pressure of the lading flowing through the valve, but it must also carry the external loads applied to the body by the line. Since the gate extends on both sides of the conduit, the load must be carried by the sides of the body. To carry this load, a reinforcing member forms a bridge between the two conduits. One method of bridging between the two conduits is to provide a reinforcing member about the shell. However, by going outside the shell to construct the bridge, another factor comes into play and that is an increased bending moment. Therefore, the line carrying reinforcement not only has to be sufficiently strong to carry the required line loads, but has to also carry the additional load required by the bridging member being removed from the run of the valve. Moreover, in low pressure valves there are short face-to-face dimensions and the conduits have rather thin walls; therefore, the conduits have a very low moment of inertia and the conduits will not withstand high line loads by simply tying the two sides together.

In reciprocating gate valves, the seats are customarily located in pockets formed in the inner hubs of the conduits. In order that the seats will maintain full sealing engagement with the face of the valve member, the hubs should remain relatively coplanar and parallel to one another so that there will be as little deformation as possible between the seats. The accumulated deformation should not exceed the amount that the seats can accommodate. The deformation results from a number of sources, such as internal valve pressure, gate loads or line loads, or a combination thereof. Internal valve pressure results from line pressure of the lading flowing through the valve and produces shell stresses within the body itself. Gate loads are produced by differential lading pressure across the closed gate. Line loads are those loads which are externally produced upon the valve, i.e., the loads caused by thermal expansion of the connecting piping, the loads caused by mechanical loads or shock on a connecting piping, loads caused by torsion, weight of line, Bourdon tube reaction, wind load, etc. As previously mentioned, to carry the line load it is necessary to have a strong structural member bridging the two conduits. The strong structural member also lessens the separating force of the body shell due to internal pressure.

Since it is desirable in describing the present invention to refer to the location of various elements in reference to their geometrical positions, it will be assumed throughout the specification and claims that the vertical direction will be a direction through the axis of the stem of the valve and that horizontal will be the direction normal to the stem; therefore, "vertical centerline" of the valve or structural center section will mean the centerline extending vertically through the valve chamber along the axis of the stem. The "centerline of the conduits" will be the centerline extending axially through the longitudinal axis of the aligned conduits, and "horizontal centerline" of the valve or the structural center section will be the centerline through the valve chamber at the intersection of the vertical centerline and the centerline of the conduits and normal to both.

It was found that if the two conduits were provided with means allowing them to be tied together rigidly along their vertical sides there would be no deformation at the horizontal centerline, but there would be excessive deformation about the vertical centerline and therefore leakage around the center portion of the seat. In an effort to prevent this cylindrical type deformation, a series of C-shaped clips were attached between the two conduits along the two vertical sides. The resulting deformation with this design was found to be negligible at the horizontal centerline, but increasing out to the edge of the clips with the unattached portion twisting to produce more deformation. It was noted that the twisting deformation of the unattached portion of the hub itself was not objectionable; however, this deformation originated from a plane which at the time it left the clip support was no longer parallel to the original plane of the hubs and this resulted in increased overall difference of deformation along the sealing face of the hub. It was decided to utilize the free hub deformation of adjacent quadrants to counteract the change in original plane angle.

In the present invention the hub portions of the two conduits are joined together by four clips equally spaced about the circumference of the conduits. With such construction, the hub is divided into the four quadrants each of which is free to independently deform. Although the deflection of the two horizontal quadrants at the vertical centerline is approximately the same as the deflection of the unattached portion in the design having a multiplicity of clips along the sides, the accumulative deflection is reduced since the deformation of adjacent quadrants tends to cancel each other. This results since the origin of deformation of each quadrant in the four clip design is from a plane parallel to the original surface. Hence, since the quadrants are free to deflect, the deflection of any quadrant tends to reduce the deflection of the two adjacent quadrants. This design can be either fabricated or cast.

By using a center section which is comprised of the two conduits plus the four bridging clips, it is possible to fabricate a valve around such center section. In effect, the center section comprises a skeleton for the valve and carries the line and gate load of the valve. Pressure containing plates are attached to the center section to form the outside shell of the valve body. The outside shell acts only as a pressure containing vessel and is not required to carry any of the gate or line loads; therefore, it can be constructed of plates designed to carry the rated pressure flowing through the valve and it is not necessary to have excessively heavy plate to act as structural members. By so constructing the valve body, all line and gate loads are carried by the structurally constructed skeleton and the shell is only required to hold pressure. Moreover, the structural center section aids in preventing stretching of the pressure containing shell from internal pressure. Additionally, the center section can be completely machined before the outer pressure containing plates are attached. Since the center section is considerably smaller than a completed valve, handling of center section for machining is considerably facilitated.

It is the primary object of the present invention to provide a fabricated gate body in which the effective deformation between the two hubs of the conduits is maintained at a minimum.

It is also an object to form a fabricated through conduit gate valve body having a structural center section which carries the line and gate load of the valve and a fabricated shell of the requisite strength to contain the internal pressure of the valve.

It is another object to provide a fabricated gate valve body which is provided with a structural center section in which the hubs of the two conduits are connected together at four points which are 45° to vertical and horizontal centerline of the valve.

It is a further object to provide a structural center section for a fabricated gate valve body in which deformation is as uniform as possible.

It is still a further object to provide a cast center section for a fabricated valve body which can be completely machined to provide seat pockets prior to incorporating it in the completed body.

It is still a further object to form a fabricated body by completely machining a cast center section and then attaching a pressure containing shell thereto.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawings, forming a part of the specifications, wherein:

FIG. 1 is an isometric view showing a fabricated through conduit gate valve formed in accordance with the present invention.

FIG. 2 is a vertical section of the valve shown in FIG. 1.

FIG. 3 is an isometric view of the center section for the valve shown in FIG. 1.

FIG. 4 is an elevational view of said center section, the front hub being removed to show the connecting clips.

FIG. 5 is a top plan view of the center section.

Referring now to the drawings, the gate valve body is formed of a center section 12 and a pressure containing shell 14. The center section 12 is a load carrying member and in effect is the skeleton for the valve body. The pressure containing shell 14 consists of the necessary elements so that the valve body can contain the internal pressure.

Attention is directed to FIGS. 3–5 where the structural center section 12 is shown separately. There are two axially aligned, spaced, cylindrical conduits 16—16 which have passageways 17—17 forming the run of the valve. The outer ends of the conduits 16—16 are provided with flanges 18—18 or other means for connecting the valve to a line as is well known in the art. The spaced inner ends of the conduits 16—16 are provided with hubs 20—20 in which are formed seat pockets 22—22 for the valve. The two conduits 16—16 are joined together by four C-shaped clips 24. These clips 24 are located approximately 45° to the horizontal centerline X and approximately 45° to the vertical centerline Y of the structural center section. The clips which connect the two conduits together may be either integrally cast to form an integral center section, or if desired they may be welded to the two conduits to form a fabricated center section. If the clips are welded, it may be desirable to form them from a number of thin plates rather than using one heavy clip, it being easier to make a series of smaller penetration welds than one extremely heavy penetration weld. Also, less heat would be involved thereby holding warpage to a minimum. The spaced conduits 16—16 together with the clips 24, however formed, form the structural center section 12 of the valve. As previously mentioned, the center section carries all the line and gate loads for the valve and except for containment of the flow of fluid while the gate is moving from either the open to the closed or the closed to the open position would together with a gate and an upstream sealing seat form a complete through conduit gate valve.

By joining the two conduits 16—16 together at four points which are 45° to each side of the vertical centerline Y of the valve, each hub 20 is divided into four quadrants each of which is free to independently deform. There are two horizontal quadrants $a$—$a$ and two vertical quadrants $b$—$b$. The origin of deformation of any quadrant is from a plane parallel to the faces 21—21 of the hubs 20—20. Accordingly, equal deformation is imposed on each side of the clip. While the deflection of the horizontal quadrants $a$—$a$ will remain approximately the same as if the two hubs were joined together rigidly by a multiplicity of clips along the vertical sides or by an uninterrupted member along the vertical sides, the overall effect is that each of the four quadrants being free to independently deform will tend to cancel out the deformation from the adjacent quadrant. Moreover, the hubs 22—22 will remain parallel to each other more so than if there were a multiplicity of clips along the side which would hold the side to virtually zero deformation and permit a cylindrical deformation of the unsecured center section at a plane not parallel to the face. Accordingly, the deformation between any two points remains such that it can be accommodated by the seats of the valve.

A particular advantage of using the center section 12 as the skeleton of the valve is that the flanges 18—18 and seat pockets 22—22 can be machined while the center section is a separate portion. Inasmuch as the center section is not as large as the overall valve, it can be machined on a smaller machine and handled with greater facility. The machining is possible since the welding necessary to attach the pressure containing shell to the center section is sufficiently removed from the flanges and seat pockets to prevent warpage.

The pressure containing shell 14 is comprised of body plates 26, side plates 28, bottom plate 30, bonnet flange ring 32, semi-cylindrical side tubes 34 and ribs 36. The pressure containing shell may be formed by first placing the body plates 26 and side plates 28 on a suitable jig and welding them together. This assembly will consist of full length body plates 26 each provided with a passage 27, and four side plates 28. There is a vertical space between side plates 28—28 to accommodate the center section 12. As can be noted in FIG. 2, the side plates 28—28 do not extend to the ends of the body plates 26—26, the reason for this will be explained subsequently. The bottom plate 30 is then welded to the bottom of each of the body plates 26—26. After this assembly has been welded together, it is cut horizontally in half across the passages 27—27. The upper half of the assembly is placed inverted on an appropriate fixture and the bonnet flange ring 32 is welded thereto. The center section is then placed over the top portion of the assembly, resting in the passage 27. The bottom half of the assembly is then placed on top of the other half of the assembly and center section 12. The passage 27 encompasses the conduits 16 of the center section 12. The body side plates 26—26 are seal welded to the conduits 16—16 of the center section 12, also, the cut between the two body plates 26—26 is seal welded. The side tubes 34—34 are then welded to the assembly. Finally, the structural ribs 36 are welded to the body plates 26. The center section 12 together with the pressure containing shell 14 now forms the valve body 10. As can be seen in FIG. 2, the side plates 28 are slightly foreshortened and do not extend to either the top or bottom of the body plates 26. By having such construction the lading which flows into the body cavity is not entrapped and can circulate. Accordingly, if the valve is on its side a drain can be installed in one of the side tubes 34 and the lading can flow through the space between the side plates 28 and top and can be drained.

In order to complete the valve, valve seats 38—38 are positioned in the seat pockets 22—22 of the center section 12. A gate 40 is introduced through the top of the valve and positioned between the seats 38—38 and side plates 28. A stem 42 is attached to the gate 40 to raise and lower the gate 48 as is well known in the art. A bonnet 44 is attached to the bonnet flange ring 32. As is well known in the art, a suitable seal is used between the bonnet 44 and bonnet flange ring 32. The bonnet is provided with packing cooperating with the stem 42 to make the valve a pressure vessel. As previously mentioned, the valve is a through conduit valve and the gate 40 has a passage 46. The side plates 28 act as a guide for the gate 40 and assure alignment of the passage 46 with the passages 17—17 of the conduits 16—16 in the open position.

While the above construction is particularly advantageous for fabricating a through conduit gate valve, the same principle of construction can be used to form a non through conduit type valve by foreshortening the lower section of the body and eliminating the passage in the gate.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A through conduit gate valve comprising: a cast structural center section formed of two axially aligned, spaced, cylindrical conduits in which are machined annular seat pockets, the opposed ends of the conduits formed into four integral bridge members joining the two conduits together, the center of attachment of each bridge member being located approximately 90° from each other and orientated 45° off the vertical centerline thereby forming the opposed spaced hubs into four independent, approximately equal portions whereby the hubs become free rings supported at equally spaced points and the four portions may independently deflect thereby becoming self-cancelling, the bridge members being so constructed as to form a passage adapted to permit the introduction of a gate member, and a pressure containing shell attached to said structural center section, said pressure containing shell formed of two parallel spaced body plates, one plate welded about each conduit, side plates welded to edges of said body plates, a bottom plate welded to one end of each of the body plates, a bonnet flange ring welded to the opposite end of each of said body plates and semi-cylindrical tubes welded to the bottom plate, bonnet flange ring and each of the body plates, said structural center section having the necessary strength to carry the line and gate load to which the valve will be subjected and the pressure containing shell being formed of plates sufficient to contain the internal pressure.

2. A fabricated through conduit gate valve body comprising: a structural center section formed of two axially aligned, spaced, cylindrical conduits, the opposed ends of the conduits formed into hubs, the opposed, spaced hubs of said conduits provided with opposed, annular seat pockets, four generally C-shaped clips joining the two conduits together dividing the opposed, spaced hubs of the conduits into four independently, approximately equal portions whereby the hubs become free rings supported at equally spaced points and the four portions may independently deflect thereby becoming self-cancelling; said center section being of sufficient strength to carry line and gate loads produced on the valve, a pressure containing shell capable of withstanding the internal pressure in the valve fabricated around the center section, the shell extending on two sides of the conduit.

References Cited in the file of this patent
UNITED STATES PATENTS

| | | |
|---|---|---|
| 1,960,127 | Smith | May 22, 1934 |
| 2,359,442 | Sandilands | Oct. 3, 1944 |
| 2,787,439 | Bredtschneider | Apr. 2, 1957 |
| 2,834,097 | Eichenberg | May 13, 1958 |
| 3,013,770 | Anderson et al. | Dec. 19, 1961 |